June 9, 1936. V. HETTINGER 2,043,437
DEVICE FOR RECUPERATING HEAT IN COOKING FOODSTUFFS OR THE LIKE
Filed April 18, 1935
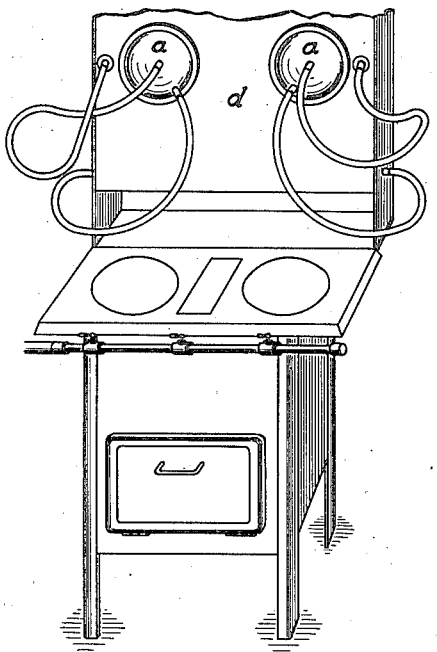
Fig.1
Fig.2
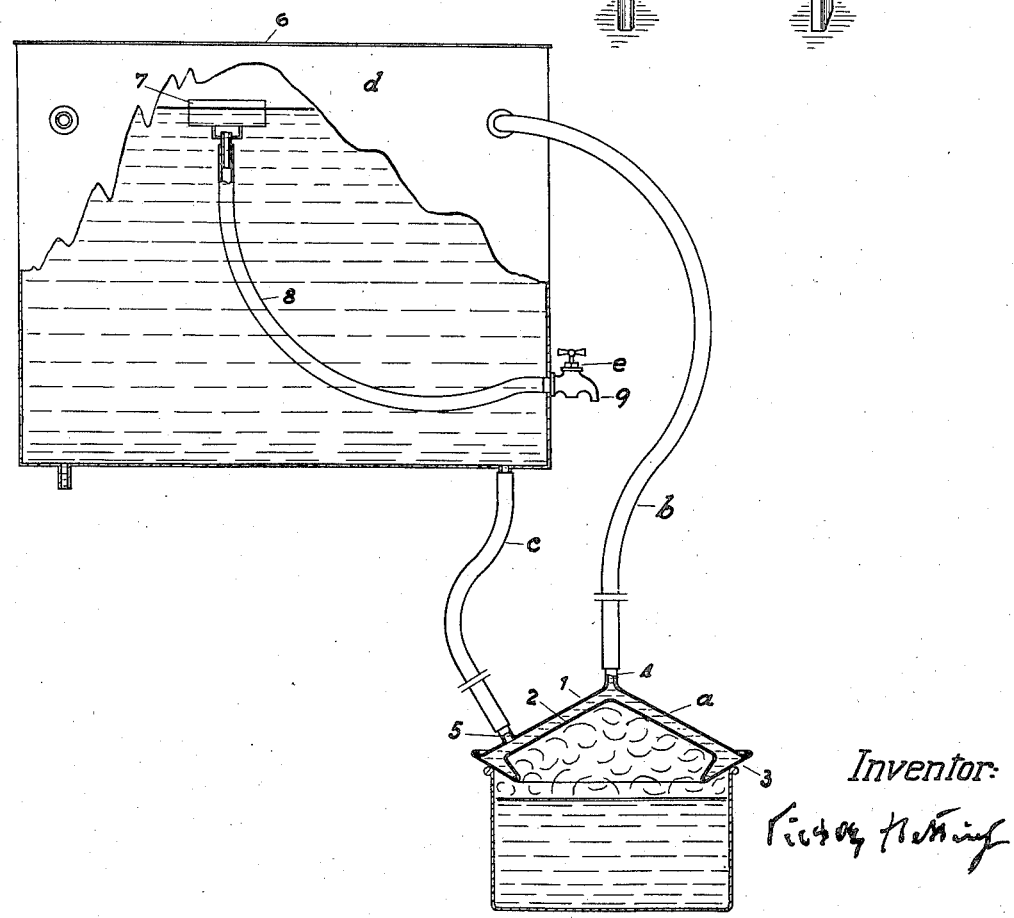
Inventor Patented June 9, 1936

2,043,437

UNITED STATES PATENT OFFICE 2,043,437

DEVICE FOR RECUPERATING HEAT IN COOKING FOODSTUFFS OR THE LIKE

Victor Hettinger, Selestat, France

Application April 18, 1935, Serial No. 17,023
In France April 27, 1934

1 Claim. (Cl. 126—344)

It is known in cooking foodstuffs or the like, to recuperate the heat carried away by the steam and vapours and to transmit it to a water container by means of a circulating system from which container hot water can then be drawn off, preferably from the free water level.

The invention relates to a device used for this purpose for recuperating the heat from cooking vessels and which consists principally of a double-walled cover provided with inlet and outlet openings and adapted to be fitted to cooking vessels of various diameters.

According to the invention, this cover comprises two relatively flat coned walls between which a small space is left and of which the free ends are bent in opposite directions and are connected by a ring-like member sloped in an angular direction to the surfaces of the cones. The cover so formed is connected in the known way by circulating pipes to a water container located at a higher level. By virtue of the particular form of the cover, the latter ensures not only a rapid heating of the water between the walls, whereby an active circulation of the latter is ensured, but also deposits formed on the inner wall are always led back to the cooking container by the inwardly directed edges of this inner wall. Moreover the cover fits to vessels of various diameters, without partly filling them up by its volume and thus reducing their capacity especially when said vessels are of a large diameter.

The accompanying drawing shows, by way of example, one embodiment of the invention.

Fig. 1 represents diagrammatically a gas cooker provided with the improved device.

Fig. 2 shows on a larger scale and in section, the general arrangement of the device.

According to these figures, the device comprises a cover $a$, two circulating pipes $b$, $c$, a supply container $d$ and a draw-off device $e$.

The cover $a$ has conveniently the form of a flattened cone with double walls 1, 2 which at their lower ends are connected by a relatively wide ring-like part 3 sloping oppositely to the cone axis. Towards the apex of the cone as well as near its lower end, are two connections 4, 5 in communication with the chamber enclosed between the walls 1, 2. By reason of the wide and sloped ring-like part 3, the cover can be fitted to a large number of containers of different dimensions. The cover serves to collect the steam and vapours rising from the contents during cooking. It therefore works in the known way as a steam dome.

Further, the ring-like part 3 bearing against the edge of the container carries away a substantial proportion of the heat leaving the vessel while the inwardly directed edge of the ring returns drops of condensed moisture which have deposited on the inner wall of the cover. The circulating pipes $b$ and $c$ are connected to the connections 4 and 5 and terminate the one at the top and the other at the bottom at the feed container $d$. The latter is either carried on feet formed by an extension of its side walls, or it is suspended. It is filled after removal of the cover 6.

A principal feature of the arrangement consists in the fact that the warm water is drawn from the feed container at the free water level. To this end the outlet is combined with a float 7 supported by the upper surface of the water and is connected by a tube or the like 8 with the cock 9 at the lower end of the container. Each feed container can moreover be fed by several covers $a$.

The method of operation is as follows:

When not in use, the covers $a$ are preferably, as shown in Fig. 1, supported from the feed container so as to be out of the way.

In use, however, the covers are fitted to the cooking vessels in which the materials to be cooked are placed. Since the feed container is at a higher level, the covers as well as the feed pipes are filled with water. The rising steam and vapours transfer their heat to the cover and to the water layer located therein, whereby a circulation of the water according to the known principle of different densities of water at different temperatures is effected, so that the water enters the cover through the connection 5 and leaves again through the connection 4. Since the water is always drawn off the water container at the water level, there is always the certainty that the warmest part of the water will be drawn off since with this type of circulating system, successive layers of water are formed of which the temperatures decrease from the top to the bottom.

The apparatus shown and described can naturally be used with any method of heating—gas, electricity, coal or the like.

I claim:

In a device for recuperating heat from a cooking vessel comprising a cover for said vessel, the cover consisting of an upper and lower conical wall in spaced relation and extending downwardly and outwardly from their apices, the free edges of said upper and lower walls being provided with oppositely extending flanges, a frusto-conical member joining said flanges and extending downwardly and inwardly for engagement with the cooking vessel, and flexible conduit means for supplying cold water to and conducting heated water from the space between said walls.

VICTOR HETTINGER.